(12) United States Patent
Toya

(10) Patent No.: US 7,731,005 B2
(45) Date of Patent: Jun. 8, 2010

(54) LOCK-UP CLUTCH MECHANISM FOR TORQUE CONVERTER

(75) Inventor: Ritsuo Toya, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 800 days.

(21) Appl. No.: 11/517,274

(22) Filed: Sep. 8, 2006

(65) Prior Publication Data

US 2007/0056821 A1 Mar. 15, 2007

(30) Foreign Application Priority Data

Sep. 12, 2005 (JP) ............................. 2005-263311

(51) Int. Cl.
*F16H 45/02* (2006.01)
*F16D 69/04* (2006.01)

(52) U.S. Cl. .................. 192/3.29; 192/107 R; 29/428; 188/218 XL

(58) Field of Classification Search ............... 192/3.29
See application file for complete search history.

(56) References Cited

U.S. PATENT DOCUMENTS

| 4,469,206 A | 9/1984 | Motomura et al. |
| 6,170,629 B1 | 1/2001 | Suzuki et al. |
| 2006/0180423 A1* | 8/2006 | Kos et al. .................. 192/3.29 |

FOREIGN PATENT DOCUMENTS

JP 57-140920 A 8/1982

\* cited by examiner

*Primary Examiner*—David D Le
*Assistant Examiner*—Erin D Bishop
(74) *Attorney, Agent, or Firm*—Miles & Stockbridge P.C.

(57) ABSTRACT

The present invention provides a lock-up clutch mechanism for a torque converter, in which a plurality of friction materials are arranged concentrically in a radial direction and adjacent friction materials are integrally connected to each other.

14 Claims, 4 Drawing Sheets

LOCK-UP CLUTCH MECHANISM FOR TORQUE CONVERTER

BACKGROUND OF THE INVENTION

1. Field of the Invention

The present invention relates to a lock-up clutch mechanism for a torque converter, used in an automatic transmission of a vehicle and the like, and more particularly, it relates to an improvement in a friction plate of a lock-up clutch mechanism.

2. Related Background Art

In recent years, in lock-up clutches for torque converters used in automatic transmissions, in order to enhance reduction of fuel consumption, lock-up has been started from an area where a vehicle speed is low. In this case, slip control of the lock-up clutch has been performed to absorb vibration of an engine during a low speed operation. That is to say, a pressure difference across a piston plate is reduced, so that a clutch facing is contacted with a front cover at a low pressure to absorb torque fluctuation of the engine.

Further, at a speed range greater than a middle speed, the clutch facing is contacted with the front cover at a higher pressure difference across the piston plate, thereby achieving complete lock-up. In an initial engagement condition and in the slop control, there has been requested to provide a friction material having an excellent μ-V property and good heat-resistance and having an ability which friction material does not generate judder in a condition that the lock-up clutch is being slipped. Further, there has been requested to provide a friction material having high coefficient of static friction and which does not generate slip in a full engagement condition.

Further, the piston plate has a tendency in which the piston plate is flexed so that an inner diameter portion thereof is shifted toward the front cover as the pressure difference is increased. Thus, in order to obtain uniform surface pressure both in case of small pressure difference and great pressure difference, it is desirable that shapes of friction materials be differentiated in a radial direction.

To satisfy such requirements, it is desirable that friction materials having different shapes and/or properties be stuck in adjacent to each other in a radial direction so as to provide optimum friction surfaces under respective conditions. An example that friction materials having different shapes and/or properties are stuck is disclosed in Japanese Patent Application Laid-open No. S57-140920 (1982).

However, as described in the Japanese Patent Application Laid-open No. S57-140920, when different friction materials are aligned in the radial direction, in order to stick the friction materials concentrically with high accuracy, a complicated sticking machine is required, and, if the friction materials are aligned before the sticking, since the friction materials are apt to be peeled easily, there arises a problem regarding workability.

SUMMARY OF THE INVENTION

Accordingly, an object of the present invention is to provide a lick-up clutch mechanism in which plural friction materials are provided with engaging portions so that, by engaging the engaging portions with each other, the friction materials are aligned accurately in a radial direction, thereby achieving good accuracy, good workability in manufacture and low cost.

To achieve the above object, a lock-up clutch mechanism for a torque converter according to the present invention is characterized in that plural friction materials are arranged concentrically in a radial direction and adjacent friction materials are integrally connected to each other.

According to the present invention, the following effects can be obtained:

By providing the engaging portions in/on the friction materials, a lock-up clutch mechanism having good accuracy, good workability in manufacture, low cost and high performance can be provided.

A high capacity lock-up clutch mechanism which can prevent vibration (judder) which may be caused by stick/slip can be provided.

DESCRIPTION OF THE PREFERRED EMBODIMENTS

Figure 1:
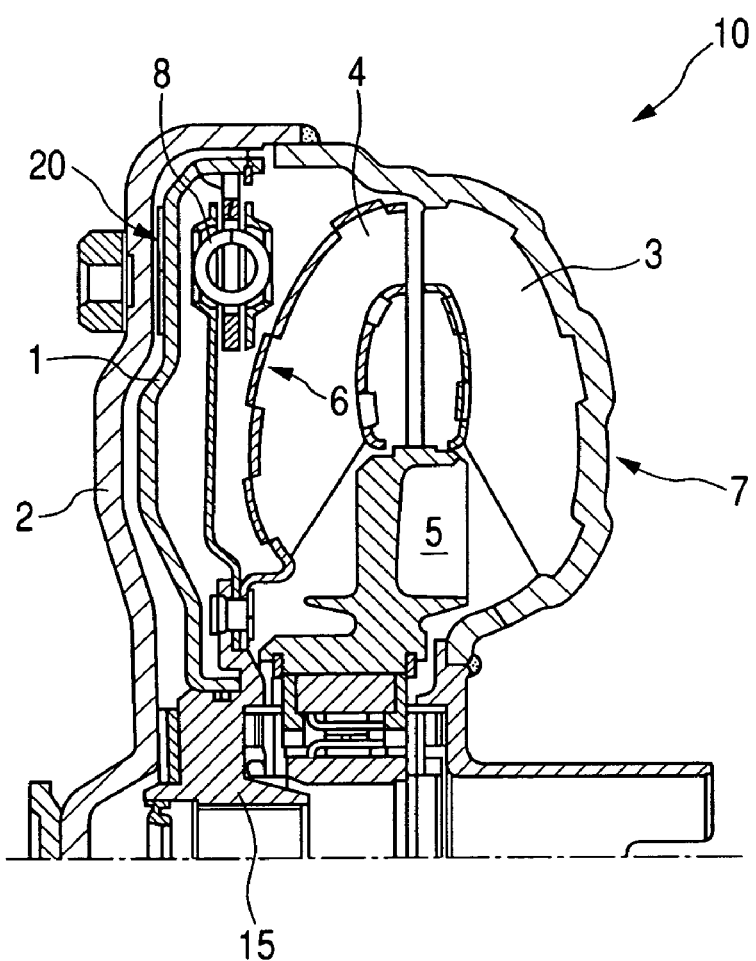
FIG. 1 is an axial sectional view of a torque converter having a lock-up mechanism to which various embodiments of the present invention can be applied.

Now, various embodiments of the present invention will be fully explained with reference to the accompanying drawings. In the drawings, the same elements are designated by the same reference numerals.

FIG. 1 is an axial sectional view of a torque converter having a lock-up mechanism to which various embodiments of the present invention can be applied. A Torque converter 10 is shown in a condition that a lock-up clutch is disengaged. The torque converter 10 comprises a front cover 2 for forming a part of a housing of the torque converter 10, an impeller 7 as a donut-shaped vaned wheel, a turbine 6 as a donut-shaped vaned wheel having blades 4 opposed to blades 3 of the impeller 7, respectively, and a stator 5 rotatably disposed between the impeller 7 and the turbine 6. The impeller 7, turbine 6 and stator 5 constitute a torque converter body.

The impeller 7 is connected to a crank shaft of the engine of a vehicle (not shown) so that the impeller is rotated together with the front cover 2 as the engine is rotated. Further, the turbine 6 is directly connected to an output member 15 and is also connected to wheels (not shown) of the vehicle via a transmission mechanism (not shown). The stator 5 is disposed substantially at a middle position between inner peripheral surfaces of the impeller 7 and the turbine 6 and has a function for changing a flow of fluid contained in the torque converter 10.

Between an inner surface of the front cover 2 and an outer surface of the turbine 6, there is provided a piston (lock-up piston) 1 of a lock-up clutch, which piston is constituted by an annular plate providing a piston movement and having a surface which is opposed to the inner surface of the front cover 2 and to which a friction material 20 is fixed by an adhesive. The piston is rotated integrally with the output member 15. A friction surface of the friction material 20 is opposed to the inner surface of the front cover 2.

In order to dampen shock generated when the piston is engaged, a damper mechanism comprising a coil spring 8 is provided between the outer surface of the turbine 6 and the piston 1.

Next, an operation of the piston 1 will be explained. If a speed of the vehicle exceeds a predetermined speed, feedback control is performed by a control mechanism (not shown), so that a flow of fluid in the torque converter 10 defined by the impeller 7 and the turbine 6 is changed by a hydraulic control mechanism (not shown). The piston 1 hydraulically controlled in response to such change is urged against the inner surface of the front cover 2, with the result that the friction material 20 is tightened against the inner surface of the front cover 2. As a result, the piston 1 is integrally coupled with the front cover, with the result that a driving force of the engine is transmitted to an output shaft (not shown) via the output member 15. Accordingly, since a driving side and an output side are mechanically connected (directly connected) each other without fluid therebetween, fluid loss can be prevented, thereby enhancing reduction of fuel consumption.

Incidentally, the torque converter 10 is connected to the hydraulic control mechanism (not shown), and the hydraulic control mechanism serves to change, i.e. to increase or decrease a flow rate of oil, while maintaining, to a substantially constant value, a pressure difference between two oil path's (i.e. an outer peripheral side and an inner peripheral side) disposed on both sides of the piston 1 in order to keep a slipping condition of the lock-up clutch, i.e. the piston 1.

Further, slip lock-up control is performed by changing the pressure difference between the outer peripheral side and the inner peripheral side, i.e. by changing a magnitude of a differential pressure between an ON side and an OFF side. While adjusting and holding the oil pressure for engaging the lock-up clutch by means of feedback control to keep a constant difference between an input rotation and an output rotation with respect to the torque converter 10, the lock-up clutch is slid, thereby achieving a semi-lock-up condition during the vehicle driving.

First Embodiment

Figure 2:
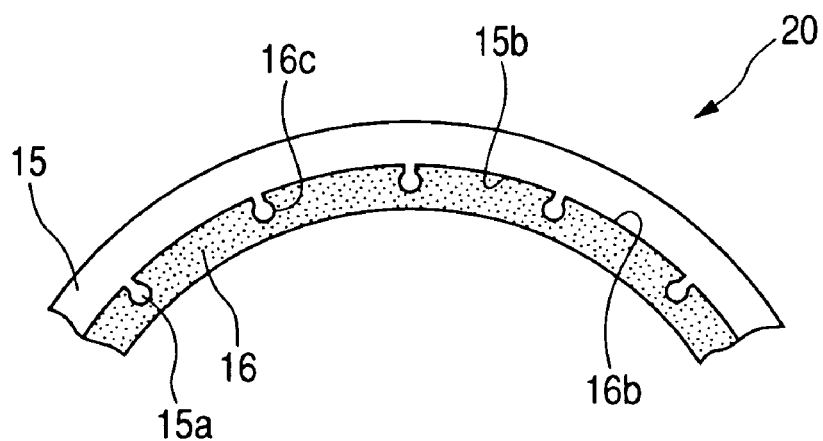
FIG. 2 is a partial front view of a friction material according to a first embodiment of the present invention.

FIG. 2 is a partial front view of a friction material according to a first embodiment of the present invention. A friction material 20 is arranged so that a substantially annular outer friction material 15 to be disposed at an outer diameter side is situated in substantially coaxial with a substantially annular inner friction material 16 to be disposed at an inner diameter side. An inner diameter portion 15b of the outer friction material 15 is opposed to and contacted with an outer diameter portion 16b of the inner friction material 16.

The outer friction material 15 has protruded portions 15a each protruding from the inner diameter portion 15b toward the inner diameter side and each having a substantially circular tip end, and the inner friction material 16 has recessed portions 16c each extending from the outer diameter portion 16b toward the inner diameter side and each having a substantially circular tip end. The plural protruded portions 15a arranged along a circumferential direction and the plural recessed portions 16c arranged along a circumferential direction are formed as complementary shapes, respectively, so that, when the protruded portions 15a are fitted into the corresponding recessed portions 16c, the outer friction material 15 is integrally connected to the inner friction material 16. Hereinbelow, it should be noted that, if not defined specially, the outer friction material and the inner friction material have substantially annular shapes.

Second Embodiment

Figure 3:
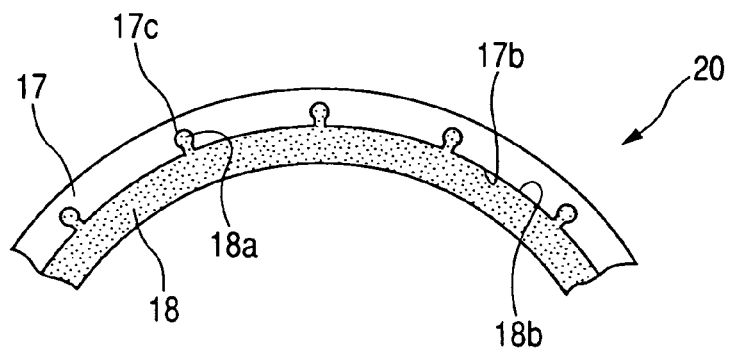
FIG. 3 is a partial front view of a friction material according to a second embodiment of the present invention.

A second embodiment of the present invention has a construction reverse to that of the first embodiment. FIG. 3 is a partial front view of a friction material according to the second embodiment of the present invention. A friction material 20 is arranged so that an outer friction material 17 to be disposed at an outer diameter side is situated in substantially coaxial with an inner friction material 18 to be disposed at an inner diameter side. An inner diameter portion 17b of the outer friction material 17 is opposed to and contacted with an outer diameter portion 18b of the inner friction material 18.

The outer friction material 17 has recessed portions 17c each extending from the inner diameter portion 17b toward the outer diameter side and each having a substantially circular tip end, and the inner friction material 18 has protruded portions 18c each protruding from the outer diameter portion 18b toward the outer diameter side and each having a substantially circular tip end. The plural recessed portions 17c arranged along a circumferential direction and the plural protruded portions 18a arranged along a circumferential direction are formed as complementary shapes, respectively, so that, when the protruded portions 18a are fitted into the corresponding recessed portions 17c, the outer friction material 17 is integrally connected to the inner friction material 18.

Third Embodiment

Figure 4:
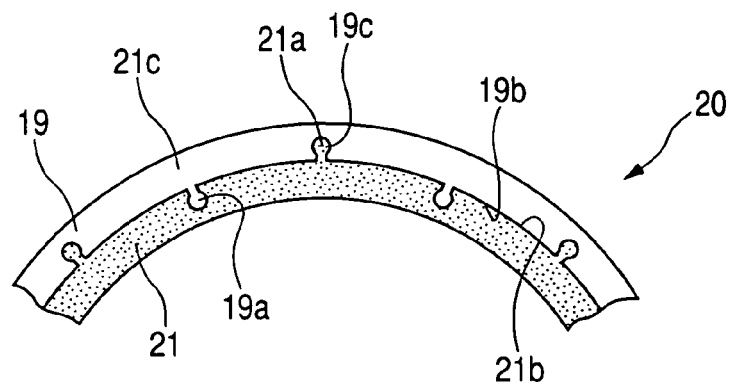
FIG. 4 is a partial front view of a friction material according to a third embodiment of the present invention.

A third embodiment of the present invention has a construction obtained by combining the first embodiment with the second embodiment. FIG. 4 is a partial front view of a friction material according to the third embodiment of the present invention. A friction material 20 is arranged so that an outer friction material 19 to be disposed at an outer diameter side is situated in substantially coaxial with an inner friction material 21 to be disposed at an inner diameter side. An inner diameter portion 19b of the outer friction material 19 is opposed to and contacted with an outer diameter portion 21b of the inner friction material 21.

The outer friction material 19 has protruded portions 19a each protruding from the inner diameter portion 19b toward the inner diameter side and each having a substantially circular tip end and recessed portions 19c each extending toward the outer diameter side and each having a substantially circular tip end, and the inner friction material 21 has protruded portions 21a each protruding from the outer diameter portion 21b toward the outer diameter side and each having a substantially circular tip end and recessed portions 21c extending toward the inner diameter side and each having a substantially circular tip.

Plural recessed portions 19c and plural protruded portions 19a, and plural recessed portions 21c and plural protruded portions 21a are arranged alternately and equidistantly along a circumferential direction, respectively. The recessed portions 19c and the protruded portions 21a, and the recessed portions 21c and the protruded portions 19a are formed as complementary shapes, respectively, so that, when the protruded portions are fitted into the corresponding recessed portions, the outer friction material 19 is integrally connected to the inner friction material 21.

Figure 5:
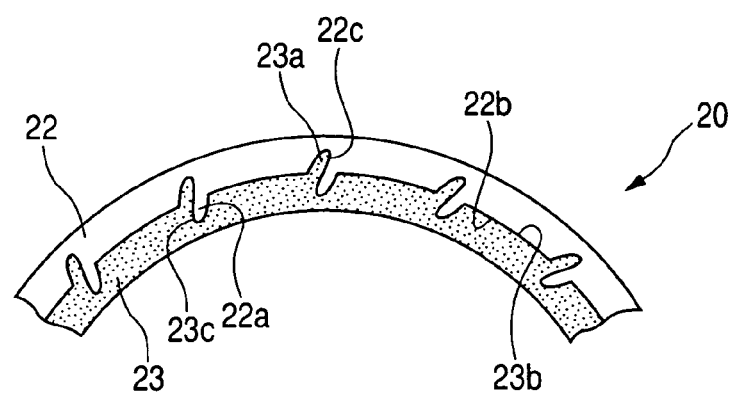
FIG. 5 is a partial front view of a friction material according to an alteration of the third embodiment of the present invention.

FIG. 5 is a partial front view of a friction material according to an alteration of the third embodiment of the present invention. A fundamental construction of this alteration is the same as that of the third embodiment shown in FIG. 4. A friction material 20 is arranged so that an outer friction material 22 to be disposed at an outer diameter side is situated in substantially coaxial with an inner friction material 23 to be disposed at an inner diameter side. An inner diameter portion 22b of the outer friction material 22 is opposed to and contacted with an outer diameter portion 23b of the inner friction material 23.

The outer friction material 22 has recessed portions 22c each extending from the inner diameter portion 22b toward the outer diameter side and protruded portions 22a each protruding toward the inner diameter side, and the inner friction material 23 has protruded portions 23a each protruding from the outer diameter portion 23b toward the outer diameter side and recessed portions 23c each extending toward the inner diameter side.

Plural recessed portions 22c and plural protruded portions 22a, and plural recessed portions 23c and plural protruded portions 23a are arranged alternately and equidistantly along a circumferential direction, respectively. The recessed portions 22c and the protruded portions 23a, and the recessed portions 23c and the protruded portions 22a are formed as complementary shapes, respectively, so that, when the protruded portions are fitted into the corresponding recessed portions, the outer friction material 22 is integrally connected to the inner friction material 23.

Fourth Embodiment

Figure 6:
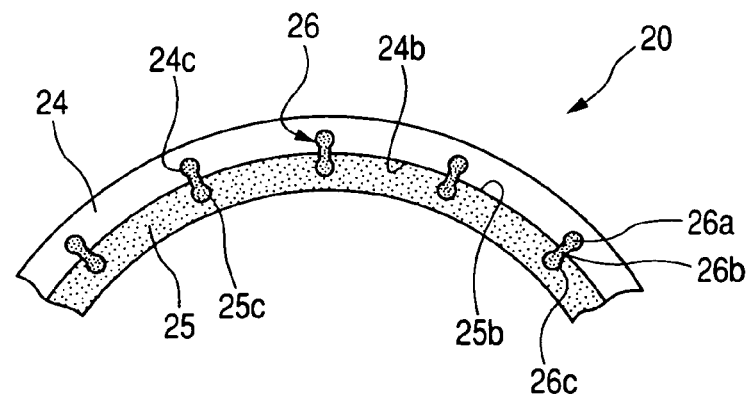
FIG. 6 is a partial front view of a friction material according to a fourth embodiment of the present invention.

FIG. 6 is a partial front view of a friction material according to a fourth embodiment of the present invention. A friction material 20 is arranged so that an outer friction material 24 to be disposed at an outer diameter side is situated in substantially coaxial with an inner friction material 25 to be disposed at an inner diameter side. An inner diameter portion 24b of the outer friction material 24 is opposed to and contacted with an outer diameter portion 25b of the inner friction material 25.

The outer friction material 24 has recessed portions 24c each extending from the inner diameter portion 24b toward the outer diameter side and each having a substantially circular tip end, and the inner friction material 25 has recessed portions 25c each extending from the outer diameter portion 25b toward the inner diameter side and each having a substantially circular tip end.

The recessed portions 24c and the recessed portions 25c are opposed to each other. In this case, there are further provided engaging members 26 each comprising a connection portion 26b and circular portions 26a and 26c integrally formed with the connection portion 26b at its both ends. When the circular portions 26a and 26c of the connection portions 26b are fitted into the opposed or paired recessed portions 24c and 25c, the outer friction material 24 is integrally connected to the inner friction material 25.

Fifth Embodiment

Figure 7:
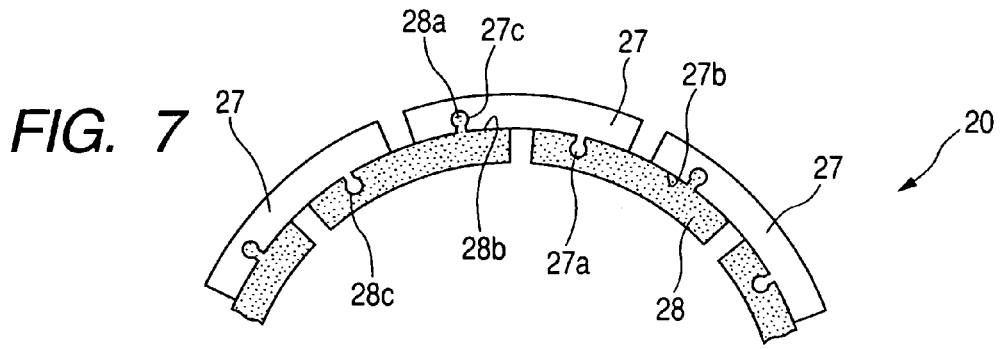
FIG. 7 is a partial front view of a friction material according to a fifth embodiment of the present invention.
Figure 8:
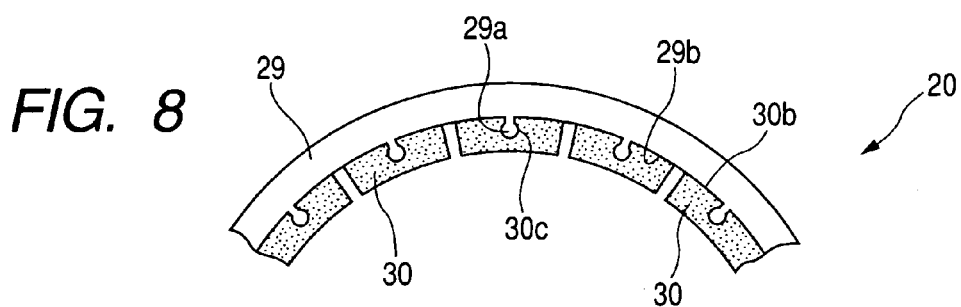
FIG. 8 is a partial front view of a friction material according to an alteration of the fifth embodiment of the present invention.
Figure 9:
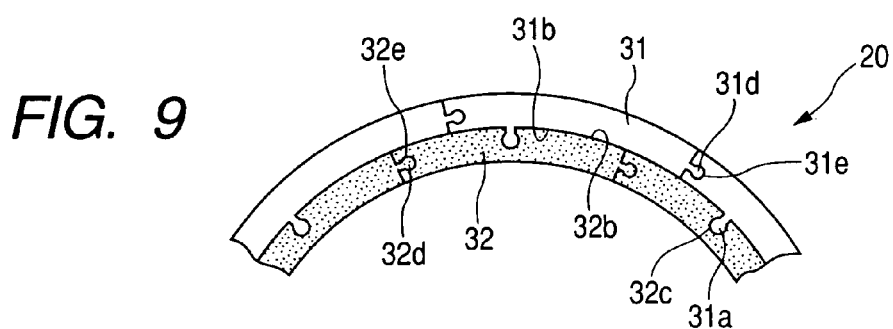
FIG. 9 is a partial front view of a friction material according to another alteration of the fifth embodiment of the present invention.

FIGS. 7 to 9 are partial front views of friction materials according to a fifth embodiment and its alterations of the present invention. In this embodiment and its alterations, unlike to the above-mentioned embodiments, in place of the annular friction material, a plurality of friction material segments having a predetermined circumferential width.

In FIG. 7, a friction material 20 is arranged so that plural outer friction material segments 27 to be disposed at outer diameter side are situated in substantially coaxial with plural inner friction material segments 28 to be disposed at an inner diameter side. Inner diameter portions 27b of the outer friction material segments 27 are opposed to and contacted with outer diameter portions 28b of the inner friction material segments 28.

Each of the outer friction material segments 27 has a protruded portion 27a protruding from the inner diameter portion 27b toward the outer diameter side and having a substantially circular tip end and a recessed portion 27c extending from the inner diameter portion 27b toward the outer diameter side and having a substantially circular tip end, and each of the inner friction material segments 28 has a protruded portion 28a protruding from the outer diameter portion 28b toward the outer diameter side and having a substantially circular tip end and a recessed portion 28c extending from the outer diameter portion 28b toward the inner diameter side and having a substantially circular tip end.

By fitting the protruded portions into the recessed portions 28c and the protruded portions 28a into the recessed portions 27c, the outer friction material segments 27 are integrally connected to the inner friction material segments 28.

As can be seen from FIG. 7, a predetermined circumferential gap is formed between the adjacent outer friction material segments 27 and a predetermined circumferential gap is also formed between the adjacent inner friction material segments 28. Further, as shown in FIG. 7, the outer friction material segments 27 and inner friction material segments 28 having substantially the same circumferential lengths are staggered with each other along the circumferential direction. The gaps between the outer friction material segments 27 and the gaps between the inner friction material segments 28 may be omitted.

FIG. 8 is a partial front view of a friction material according to an alteration of the fifth embodiment. In this example, an outer friction material 29 is formed as a substantially annular friction material similar to those shown in FIGS. 1 to 4, in place of the segments, and, only an inner friction material is constituted by segments. A plurality of inner friction material segments 30 are arranged along the circumferential direction with a predetermined circumferential gap therebetween. An inner diameter portion 29b of the outer friction material 29 is opposed to and contacted with outer diameter portions 30b of the inner friction material segments 30.

The outer friction material 29 has protruded portions 29a each protruding from the inner diameter portion 29b and each having a substantially circular tip end, and each of the inner friction material segments 30 has a recessed portion 30c extending from the outer diameter portion 30b toward the inner diameter side and having a substantially circular tip end. By fitting the protruded portions 29a into the recessed portions 30c, the outer friction material 29 is integrally connected to the inner friction material segments 30.

FIG. 9 is a partial front view of a friction material according to another alteration of the fifth embodiment. In this example, outer and inner friction materials constituting a friction material 20 are both formed as segments. A plurality of outer friction material segments 31 are arranged along a circumferential direction while contacting with each other. A plurality of inner friction material segments 32 are also arranged along a circumferential direction while contacting with each other.

An inner diameter portion 31b of each outer friction material segment 31 is opposed to and contacted with an outer diameter portion 32b of each inner friction material segment 32. Each outer friction material segment 31 has a protruded portion 31a protruding from the inner diameter portion 31b and having a substantially circular tip end, and each inner friction material segment 32 has a recessed portion 32c extending from the outer diameter portion 32b toward the inner diameter side and having a substantially circular tip end. By fitting the protruded portions 31a into the recessed portions 32c, the outer friction material segments 31 are integrally connected to the inner friction material segments 32.

In the embodiment shown in FIG. 9, in order to ensure integration of the adjacent friction material segments in the circumferential direction, circumferential engaging means are provided for the outer and inner friction material segments. Each outer friction material segment 31 is provided with a protruded portion 31d protruding from a circumferential one end thereof and having a substantially circular tip end and is also provided at it's the other end with a recessed portion 31e having a substantially circular tip end. By fitting the protruded portions 31d into the recessed portions 31e, the adjacent outer friction material segments 31 are integrated with each other. As a result, a substantially annular outer friction material is formed.

Similarly, each inner friction material segment 32 is provided with a protruded portion 32d protruding from a circumferential one end thereof and having a substantially circular tip end and is also provided at it's the other end with a recessed portion 32e having a substantially circular tip end. By fitting the protruded portions 32d into the recessed portions 32e, the adjacent inner friction material segments 32 are integrated with each other. As a result, a substantially annular inner friction material is formed.

In the embodiment shown in FIG. 9, even when the friction material segments are used, similar to the embodiments described with reference to FIGS. 2 to 5, an integrated construction as achieved by using substantially circular outer and inner friction materials can be obtained.

Sixth Embodiment

Figure 10:
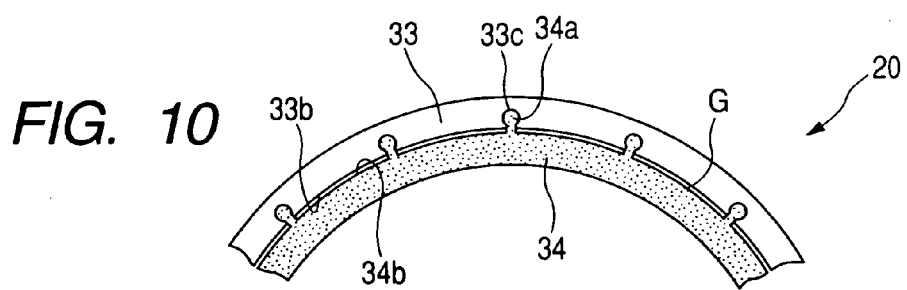
FIG. 10 is a partial front view of a friction material according to a sixth embodiment of the present invention.

FIG. 10 is a partial front view of a friction material according to a sixth embodiment of the present invention. A friction material 20 is arranged so that an outer friction material 33 to be disposed at an outer diameter side is situated in substantially coaxial with an inner friction material 34 to be disposed at an inner diameter side. Unlike to the above-mentioned embodiments, an inner diameter portion 32b of the outer friction material 33 is opposed to but is not contacted with an outer diameter portion 34b of the inner friction material 34. In this case, a gap G extending continuously in a circumferential direction and having a predetermined radial width is provided between the inner diameter portion 32b and the outer diameter portion 34b.

The inner friction material 34 has protruded portions 34a each protruding from the outer diameter portion 34b and each having a substantially circular tip end, and the outer friction material 33 has recessed portions 33c each extending from the inner diameter portion 33b toward the outer diameter side and each having a substantially circular tip end. By fitting the protruded portions 34a into the recessed portions 33c, the outer friction material 33 is integrally connected to the inner friction material 34 with the interposition of the gap G.

Figure 11:
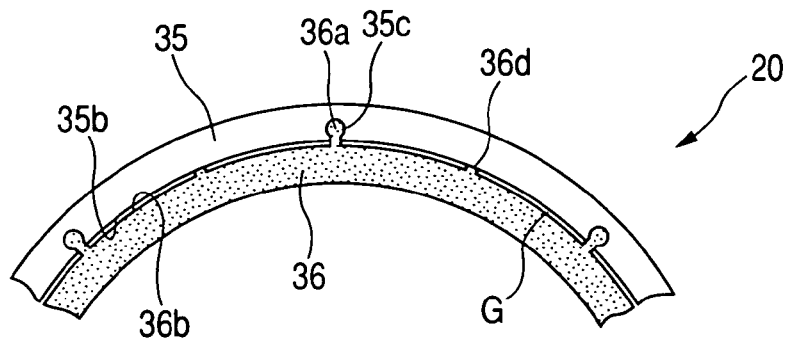
FIG. 11 is a partial front view of a friction material according to an alteration of the sixth embodiment of the present invention.

FIG. 11 is a partial front view of a friction material according to an alteration of the sixth embodiment of the present invention.

Similar to the embodiment shown in FIG. 10, an inner diameter portion 35b of an outer friction material 35 constituting a part of a friction material 20 is opposed to but is not contacted with an outer diameter portion 36d of an inner friction material 36 constituting the other part of the friction material 20. In this case, a gap G extending continuously in a circumferential direction and having a predetermined radial width is provided between the inner diameter portion 35b and the outer diameter portion 36b.

The inner friction material 36 has protruded portions 36a each protruding from the outer diameter portion 36b and each having a substantially circular tip end, and the outer friction material 35 has recessed portions 35c each extending from the inner diameter portion 35b toward the outer diameter side and each having a substantially circular tip end. By fitting the protruded portions 36a into the recessed portions 35c, the outer friction material 35 is integrally connected to the inner friction material 36 with the interposition of the gap G.

In the alteration shown in FIG. 11, the outer diameter portion 36b of the inner friction material 36 is provided with projections 36d each protruding toward the outer diameter side. The projections 36d and the protruded portions 36a are alternately arranged along the circumferential direction. Each projection 36d has a length so that a tip end of the projection abuts against the inner diameter portion 35b.

Seventh Embodiment

Figure 12:
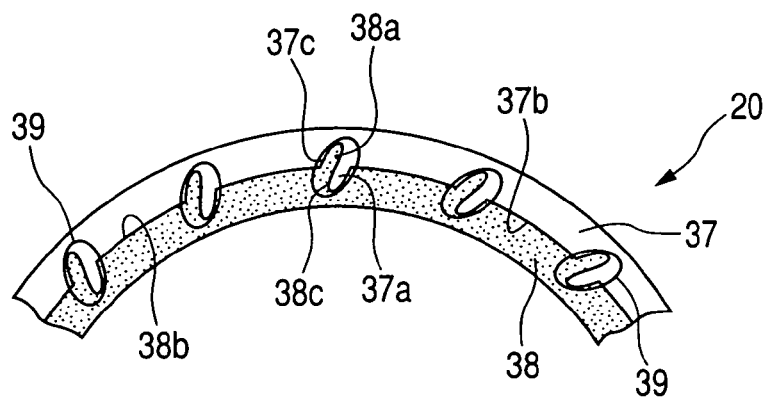
FIG. 12 is a partial front view of a friction material according to a seventh embodiment of the present invention.

FIG. 12 is a partial front view of a friction material according to a seventh embodiment of the present invention. A fundamental construction is the same as that of the embodiment shown in FIG. 5. A friction material 20 is arranged so that an outer friction material 37 to be disposed at an outer diameter side is situated in substantially coaxial with an inner friction material 38 to be disposed at an inner diameter side. An inner diameter portion 37b of the outer friction material 37 is opposed to and contacted with an outer diameter portion 38b of the inner friction material 38.

The outer friction material 22 has recessed portions 37c each extending from the inner diameter portion 372b toward the outer diameter side and protruded portions 37a each protruding toward the inner diameter side, and the inner friction material 38 has protruded portions 38a each protruding from the outer diameter portion 38b toward the outer diameter side and recessed portions 38c each extending toward the inner diameter side.

Plural recessed portions 37c and plural protruded portions 37a, and plural recessed portions 38c and plural protruded portions 38a are arranged alternately and equidistantly along a circumferential direction, respectively. The recessed portions 37c and the protruded portions 38a, and the recessed portions 38c and the protruded portions 37a are formed as complementary shapes, respectively, so that, when the protruded portions are fitted into the corresponding recessed portions, the outer friction material 37 is integrally connected to the inner friction material 38.

In the seventh embodiment, engaging portions constituted by the respective protruded portions and recessed portions or surrounding portions 39 including the engaging portions are formed by an urging process so that thicknesses of these portions become smaller than a thickness of the friction material. By urging these portions, an engaging condition between the protruded portion and the recessed portion is strengthened. Further, since the surrounding portions 39 are thinner than the remaining portions, the engaging portions can be prevented from being damaged the sliding movement.

Eighth Embodiment

Figure 13:
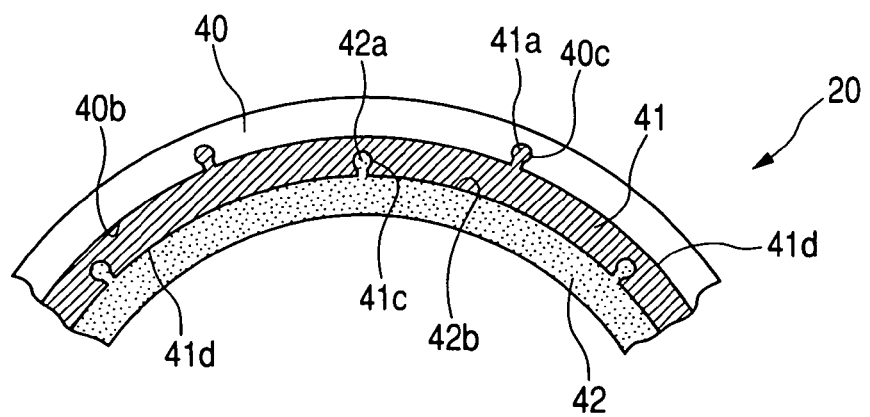
FIG. 13 is a partial front view of a friction material according to an eighth embodiment of the present invention.

FIG. 13 is a partial front view of a friction material according to an eighth embodiment of the present invention. In this embodiment, a friction material 20 is constituted by a plurality of friction materials 40, 41 and 42 which are disposed concentrically. Starting from an outer diameter side, these friction materials are referred to as a first friction material 40, a second friction material 41 and a third friction material, respectively. Although the plurality of these friction materials has concentric shapes, cross-sectional shapes and/or groove shapes thereof may be differentiated. Further, although these friction materials may be formed from different substances, these three friction materials may have the same shape and property.

The first friction material 40 disposed at an outermost side is arranged substantially in concentric with the second friction material 41 disposed at an inner diameter side of the first friction material. An inner diameter portion 40b of the first friction material 40 is opposed to and contacted with an outer diameter portion 41b of the second friction material 41, and an inner diameter portion 41d of the second friction material 41 is opposed to and contacted with an outer diameter portion 42b of the third friction material 42.

The first friction material 40 has recessed portions 40c each extending from the inner diameter portion 40b toward the outer diameter side and each having a substantially circular tip end, and the second friction material 41 has protruded portions 41a each protruded from the outer diameter portion 41b toward the outer diameter side and each having a substantially circular tip end.

This application claims priority from Japanese Patent Application No. 2005-263311 filed on Sep. 12, 2005, which is hereby incorporated by reference herein.

What is claimed is:

1. A lock-up clutch mechanism for a torque converter, comprising:
   a plurality of friction materials arranged concentrically in a radial direction,
   wherein radially adjacent friction materials are integrally connected to each other through radially extending engaging portions of the radially adjacent friction materials.

2. A lock-up clutch mechanism according to claim 1, wherein an inner diameter portion of one of the friction materials disposed at an outer diameter side has a radially extending protruded engaging portion, and an outer diameter portion of a radially adjacent one of the friction materials disposed at an inner diameter side has a radially extending recessed engaging portion such that said one and said radially adjacent one of the friction materials are integrally connected to each other by engaging said protruded engaging portion with said recessed engaging portion.

3. A lock-up clutch mechanism according to claim 1, wherein one of said radially extending engaging portions or a surrounding portion including said one radially extending engaging portion has a thickness thereof that is smaller than a thickness other portions of the respective friction material.

4. A lock-up clutch mechanism according to claim 3, wherein said one radially extending engaging portion or said surrounding portion is formed by an urging process such that the thickness thereof is smaller than the thickness of other portions of the respective friction material.

5. A lock-up clutch mechanism according to claim 1, wherein an inner diameter portion of one of the friction materials disposed at an outer diameter side has a radially extending recessed engaging portion, and an outer diameter portion of a radially adjacent one of the friction materials disposed at an inner diameter side has a radially extending protruded engaging portion such that said one and said radially adjacent one of the friction materials are integrally connected to each other by engaging said protruded engaging portion with said recessed engaging portion.

6. A lock-up clutch mechanism according to claim 1, wherein an inner diameter portion of one of the friction materials disposed at an outer diameter side has a first radially extending protruded engaging portion and a first radially extending recessed engaging portion, and an outer diameter portion of a radially adjacent one of the friction materials disposed at an inner diameter side has a second radially extending recessed engaging portion and a second radially extending protruded engaging portion such that said one and said radially adjacent one of the friction materials are integrally connected to each other by said first protruded engaging portion and said first recessed engaging portion engaging with said second recessed engaging portion and said second protruded engaging portion, respectively.

7. A lock-up clutch mechanism according to claim 1, wherein an inner diameter portion of one of the friction materials disposed at an outer diameter side has a first radially extending recessed engaging portion, an outer diameter portion of a radially adjacent one of the friction materials disposed at an inner diameter side has a second radially extending recessed engaging portion, and an engaging piece is fitted into said first and second recessed engaging portions such that said one and said radially adjacent one of the friction materials are integrally connected to each other through said first and second recessed engaging portions and said engaging piece fitted therein.

8. A lock-up clutch mechanism according to claim 1, wherein the plurality of friction materials includes a plurality of friction material segments arranged along a circumferential direction.

9. A lock-up clutch mechanism according to claim 8, wherein the friction material segments arranged along the circumferential direction have additional engaging portions extending in the circumferential direction.

10. A lock-up clutch mechanism according to claim 1, wherein a gap is formed between one of the friction materials disposed at an outer diameter side and a radially adjacent one of the friction materials disposed at an inner diameter side.

11. A lock-up clutch mechanism according to claim 10, wherein a centering portion is provided on an inner periphery of said one of the friction materials disposed at the outer diameter side or/and an outer periphery of said radially adjacent one of the friction materials disposed at the inner diameter side.

12. A lock-up clutch mechanism according to claim 1, further comprising a lock-up piston and a front cover adapted to be engaged by said lock-up piston, and wherein said plurality of friction materials is disposed on at least one of said lock-up piston and said front cover.

13. A method for manufacturing a lock-up clutch mechanism having a lock-up piston and a front cover adapted to be frictionally engaged with the lock-up piston, the method comprising:

providing a plurality of frictional materials arranged concentrically in a radial direction and integrally connected to each other through radially extending engaging portions of radially adjacent friction materials; and attaching the integrally connected friction materials to at least one of said lock-up piston and said front cover.

14. A lock-up clutch mechanism according to claim 1, wherein a first one of the plurality of friction materials, a second one of the plurality of friction materials and a third one of the plurality of friction materials are provided in this order from an outermost side, wherein an inner diameter portion of said first one of the friction materials has a first radially extending recessed engaging portion and an outer diameter portion of said second one of the friction materials has a second radially extending protruded engaging portion such that said first and second ones of the friction materials are integrally connected to each other by said second protruded engaging portion engaging with said first recessed engaging portion, and wherein an inner diameter portion of said second one of the friction materials has a second radially extending recessed engaging portion and an outer diameter portion of said third one of the friction materials has a third radially extending protruded engaging portion such that said second and third ones of the friction materials are integrally connected to each other by said third protruded engaging portion engaging with said second recessed engaging portion, thereby integrally connecting said first, said second and said third ones of the friction materials with each other.

* * * * *